United States Patent [19]

McManus

[11] 3,753,030

[45] Aug. 14, 1973

[54] GAIN COMPENSATED TRAVELING WAVE TUBE

[75] Inventor: William K. McManus, Gainesville, Fla.

[73] Assignee: Sperry Rand Corporation, New York, N.Y.

[22] Filed: June 1, 1972

[21] Appl. No.: 258,672

[52] U.S. Cl. .................................. 315/3.6, 315/39.3
[51] Int. Cl. .................................. H01j 25/34
[58] Field of Search .................................. 315/3.6, 39.3

[56] References Cited

UNITED STATES PATENTS

| | | | |
|---|---|---|---|
| 3,088,105 | 4/1963 | Beam | 315/3.6 X |
| 3,293,482 | 12/1966 | Wolkstein | 315/3.6 X |
| 3,037,168 | 5/1962 | Forrer | 315/3.6 X |
| 3,024,384 | 3/1962 | Itzkan et al. | 315/3.6 |
| 2,995,226 | 10/1960 | Currie et al. | 315/3.6 |

*Primary Examiner*—Rudolph V. Rolinec
*Assistant Examiner*—Saxfield Chatmon, Jr.
*Attorney*—Howard P. Terry

[57] ABSTRACT

A dual-helix slow wave traveling wave tube has successive amplification sections associated with first and second input transmission lines, the first amplification section compensating for the high frequency power deficiencies of the second amplification section when the amplifier is operated over a wide range of input power levels.

8 Claims, 4 Drawing Figures

GAIN COMPENSATED TRAVELING WAVE TUBE

BACKGROUND OF THE INVENTION

1. Field of the Invention

The invention pertains to electron beam slow wave propagation traveling wave tubes and more particularly concerns auxiliary amplification means for compensating for high frequency power gain deficiencies normally present in conventional traveling wave tubes when operated over a wide range of power levels.

2. Description of the Prior Art

Generally, electron beam traveling wave tubes of conventional types are not suited to operate effectively at two or more widely spread high frequency, high power levels, as they do not maintain reasonably acceptable high frequency efficiency, stability, high freqeuncy power gain, and gain constancy under such circumstances. Conventional traveling wave tubes of the helix type normally exhibit significant gain deficiencies, even when designed for the aforementioned particular application. The gain difference, especially in the upper frequency pass band of the tube, may be as great as 8 to 12 dB. when the tube is switched between high and low input power operating levels. This gain difference is even more undesirably severe in conventional tubes particularly designed for operation at large high-to-low carrier power ratios.

SUMMARY OF THE INVENTION

The present invention relates to a dual amplification stage traveling wave vacuum tube with colineraly extensive high frequency energy-electron beam interaction elements, each element having its particular associated input transmission line device. The first amplification section is used to amplify low level input signals, compensating for high frequency power deficiencies of the second amplification section when operated over a wide power level range. Power gain for low level signals is enhanced and the low level gain characteristic is shaped substantially to match the high level signal power gain profile substantially over the pass band of the tube.

DESCRIPTION OF THE PREFERRED EMBODIMENTS

Figures 1A, 1B:
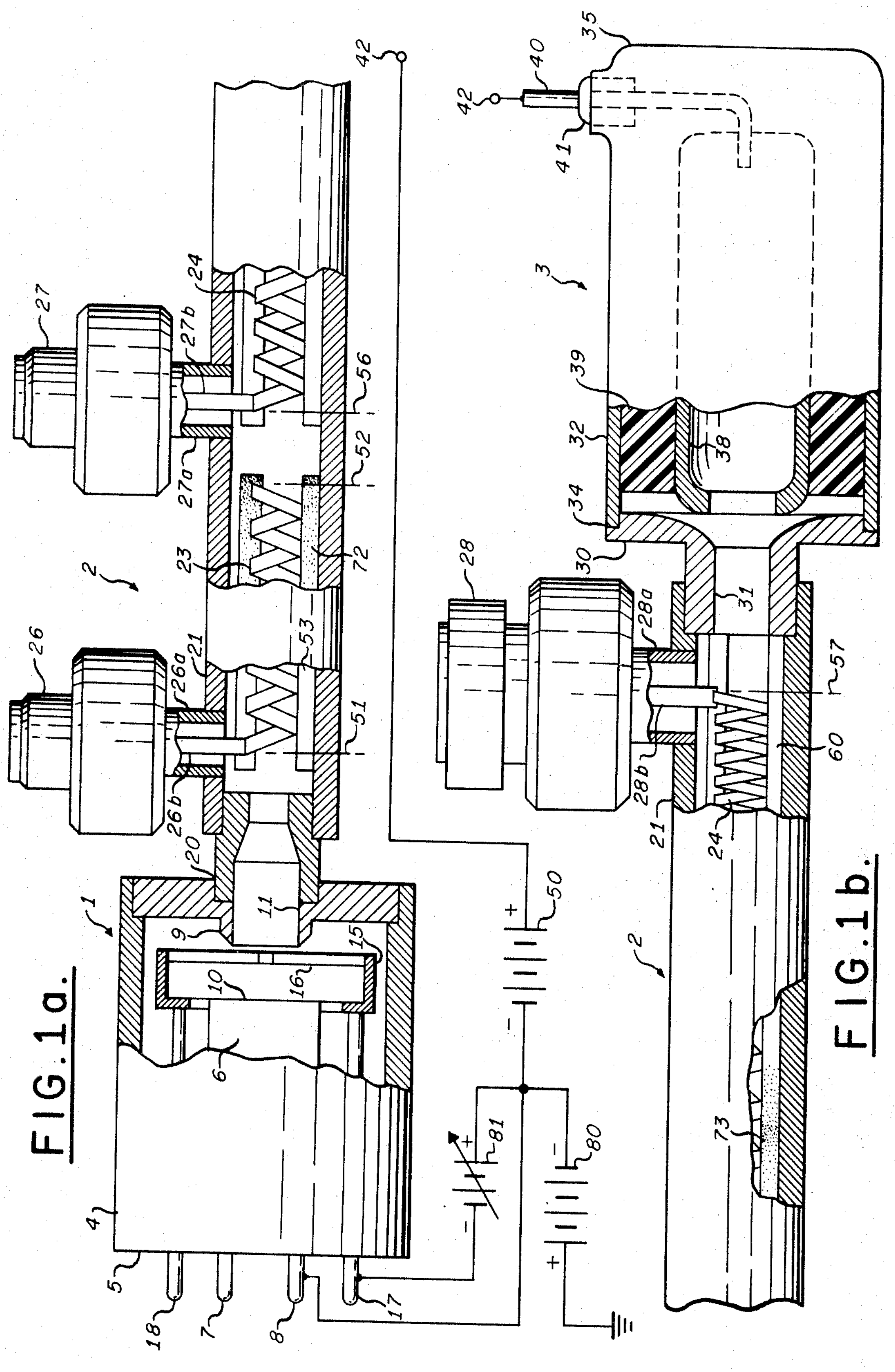
FIGS. 1A and 1B are plan views, partly in cross section, of first and second integral parts of a preferred embodiment of the invention.

In FIGS. 1A and 1B, there is illustrated a traveling wave vacuum tube of the high frequency or microwave kind having a cathode assembly 1 for producing a collimated beam of electrons, a high frequency interaction region 2 in which the kinetic energy of the electron beam may be partially converted into amplified very high frequency signals propagating on a slow wave propagation medium, and an electron beam collector assembly 3 wherein the remaining kinetic energy of the electron beam may be converted to heat.

The cathode assembly 1 includes a cylindrical vacuum shell 4 forming part of the vacuum envelope of the tube, being further closed by a suitable disk-shaped end closure. The end closure 5 supports a cathode structure 6 within the interior of vacuum shell 4. Interior connections to the cathode and to heater elements (not shown) within cathode structure 6 are made through conventional electrically conductive pin connectors 7 and 8 projecting through end closure 5 that support cathode 6. An acceleration electrode 9 is positioned within vacuum shell 4 opposite end closure 5 adjacent the emitting surface 10 of cathode 6, the anode 9 having a central opening 11 and forming in combination with cathode emitter 10 an electron gun assembly for directing an electron beam along the longitudinal axis of the high frequency tube.

Between emitter 10 and electrode 9 is placed an electron beam focus or control electrode 15 which may include a wire grid or a grid formed of radially extending ribbons or vanes of well known type. Such grids may be of the general mechanical type illustrated, for example, in the A.E. Harrison et al U.S. Pat. No. 2,414,785, issued Jan. 21, 1947 for a "High Frequency Tube Structure", or in the C.E.Rich U.S. Pat. No. 3,160,782 issued Dec. 8, 1964 for a "High-Mu Negative Control Grid Velocity Modulation Tube", both patents being assigned to the Sperry Rand Corporation. The control electrode 15 may be supplied with electrical potential and may be supported by electrically conductive pin connectors 17 and 18 also projecting in insulated relation through end closure 5.

The vacuum shell 4 and anode 9 are mutually fastened by welding or brazing in the vicinity of annular junction 20 to a further portion of the vacuum envelope of the tube in the form of the extended hollow cylindrical shell 21. Shell 21, as will be further discussed, encloses the novel slow wave helix propagation structures 23 and 24 of the present invention and is penetrated by a pair of high frequency input transmission line systems 26 and 27 and a high frequency output transmission line system 28 for the respective purposes of selectively supplying high frequency energy to be amplified to first ends of the slow wave propagation transmission lines 23 and 24 and of abstracting amplified high frequncy energy therefrom at the opposite end of transmission line 24. The end of hollow cylinder or shell 21 opposite cathode emitter 10 is partially closed by the end wall 30, wall 30 having an aperture 31 through which the electron beam is projected into electron beam collector assembly 3. The apertured wall 30 and a tubular wall 32 form a further extension of the vacuum envelope of the tube and are sealed adjacent annular junction 34 by welding or brazing. The cylindrical tube 32 is closed in a vacuum tight fashion at its end opposite apertured end wall 30 by a solid disk or other closure which may be sealed to tube 32, for example.

The cathode structure 6 employed in the invention is of generally conventional character and may be selected from one of the types of electron beam forming cathodes which have been employed in various forms in prior art traveling wave tubes or klystrons. tThe electron beam collector assembly 3, like the cathode structure 6, may take a conventional form, suitable forms of these elements being discussed, for example, in the U.S. Pat. No. 2,887,608, entitled "Traveling Wave Tube", filed in the name of Warren D. McBee by the Sperry Rand Corporation, and issued May 19, 1959. In magnetically focussed forms of the traveling wave tube illustrated in FIGS. 1A and 1B, the apertured anode 9 and the apertured end wall 30 may comprise magnetic pole pieces, thus forming part of a conventional magnetic circuit (not shown in its entirety) for focussing the high current electron beam generated by cathode structure 6.

The electron beam collector assembly 3, in the instance of relatively high power versions of the vacuum tube of FIGS. 1A and 1B, may take the form of any of several electron beam collector configurations available in the prior art for dissipating relatively large amounts of unused electron beam energy or for providing more efficient operation of the apparatus by returning a major portion of the unused electron beam energy to the power source. Suitable depressed collector devices for the latter purposes are illustrated, for example, in the U.S. Pat. No. 3,173,004, entitled "Depressed Collecor Operation of Electron Beam Devices", issued Mar. 2, 1965 to R.J. von Gutfeld and C.C. Wang or in the U.S. Pat. application Ser. No. 173,053 to T.R. Doyle, filed Aug. 19, 1971 now U.S. Pat. No. 3,717,787 for a "Compact Depressed Electron Beam Collector", both inventions being assigned to the Sperry Rand Corporation.

The electron beam collector assembly 3 of FIG. 1A consists of a metallic beam collector cavity 38 preferably of oxygen-free copper supported within a cylinder 39 of beryllium oxide brazed, in turn, in fixed relation within the interior of the tubular wall of vacuum shell 32. The beryllium oxide cylinder 39 supports beam collector cavity 38 in electrically insulated relation with the tubular vacuum shell 32, but affords a low thermal impedance path to aid the escape of heat from beam collector cavity 38 to the exterior of the tube. The interior of the metal cavity 38 serves directly to collect spent electrons from cathode structure 6 and is operated at an appropriate electrical potential when conductor 40, extending through the insulating vacuum seal 41 in collector 3, is coupled via terminal 41 to battery 50 of FIG. 1A. It will be obvious that terminal 42 of FIG. 1A is the same terminal as terminal 42 of FIG. 1B.

The first helix 23 in the high frequency interaction region 2 has coupled to it a conventional input coaxial transmission line 26 having an appropriate vacuum seal therein, the outer conductor 26*a* thereof being sealed in vacuum envelope shell 21 and the inner conductor 26*b* thereof being fastened, as by spot welding, to the first turn of helix 23. It will be understood that input 26 normally receives relatively low level input signals. The helix 23 has a first or input end located at entrance plane 51 and a second end located at exit plane 52. Helix 23 is supported within shell 21 by a trio of conventional ceramic support rods, such as rod 53. Helix 23 has a substantially constant pitch.

The second helix 24 within the vacuum shell 21 of high frequency interaction region 2 has coupled to it what may be a conventional input coaxial transmission line 27, normally receiving relatively high level input signals and having an appropriate vacuum seal therein, the outer conductor 27*a* thereof being sealed, as by brazing, in vacuum envelope or shell 21 and the inner conductor 26*b* thereof being fastened to the first turn of helix 24. The helix 24 preferably has a non-constant pitch and has a first or input end located at entrance plane 56 and a second end located at exit plane 57 (FIG. 1B). The exit plane 57 is also the location of a coaxial output transmission line 28 with inner and outer conductors 28*a* and 28*b* . *While other vacuum sealed output transmission lines may be used, a high power transmission device such as shown in the J.L.Rawls, U.S. patent application Ser. No.* 122,877, filed Mar. 10, 1971 issued Dec. 26, 1972 as U.S. Pat. No. 3,707,647, for a "High Frequency Vacuum Tube Energy Coupler" and assigned to the Sperry Rand Corporation, may be employed. The outer conductor 28*a* is sealed in vacuum tight relation within vacuum shell 21, while the inner conductor 28*b* is affixed to the end of the last turn of helix 24. Helix 24 is supported within the hollow vacuum shell 21 by a trio of conventional support rods, such as rod 60, which may be constructed of beryllium oxide.

Figure 2:
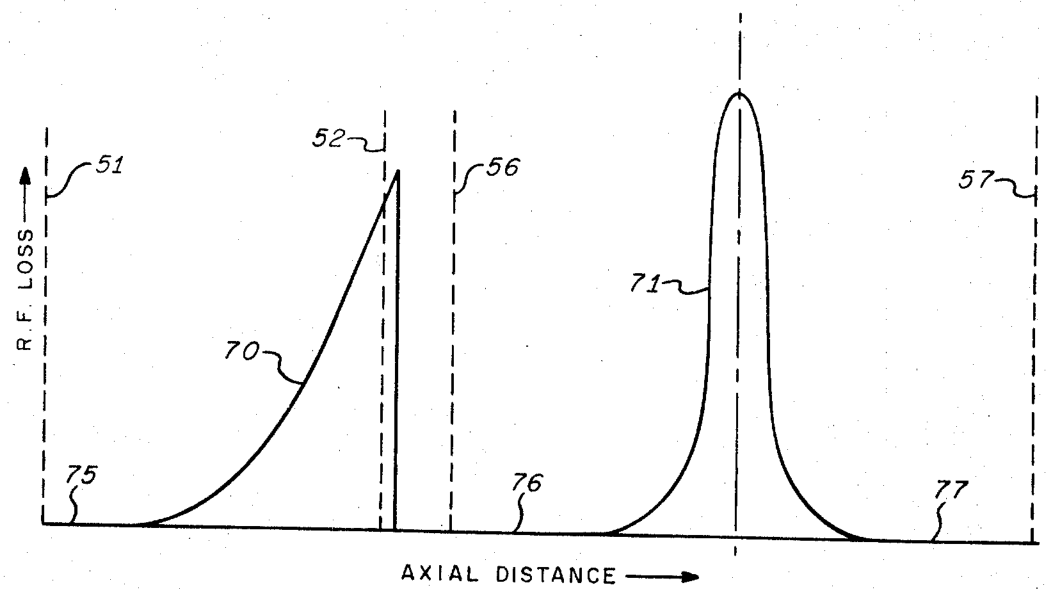
FIGS. 2 and 3 are graphs useful in explaining the operation of the invention.

The dual-helix traveling wave tube is provided with attenuation material on the ceramic support rods 53 and 60. FIG. 2 illustrates an empirically derived curve for determining the distribution of attenuator material along support rods 53. It represents a graph of high frequency energy loss plotted against distance along the tube axis. The respective entrance planes 51 and 56 and exit planes 52 and 57 of FIGS. 1A and 1B are again shown as reference planes in FIG. 2.

It is seen that the attenuation material dispersed on rods 53 associated with helix 23 serves as a complete termination, absorbing substantially all energy flowing on helix 23 before or by the time it reaches exit plane 52. It is seen that the attenuation material 72 producing loss curve 70 is formed by a graded deposit of carbon on ceramic rods 53 increasing from a zero thickness value at about 0.30 of the distance between planes 51 and 52 in a rapidly rising manner to a sharp maximum at exit plane 52.

The dispersion of attentuation material 73 on insulator rods 60 supporting helix 24 in effect severs helix 24 into two active gain-producing regions. As seen in FIG. 2, the empirical power loss curve 71 representative of the second attenuator 73 places the center of the attenuator 73 at about mid-way between planes 56 and 57. Attenuator 73 is symmetric, of the general form of a Gaussian distribution curve, starts from a zero attenuation value at substantially 0.25 of the distance between planes 56 and 57, and drops again to zero attenuation at substantially 0.75 of the distance between planes 56 and 57. Curve 70 has a maximum about 0.83 as high as the maximum of curve 71. The respective loss-free or zero attenuation regions 75 and 76 and 77 are selected on the basis of empirical adjustment and on the basis of the desired high frequency gain for the respective associated helix sections.

The cathode structure 6, focus control electrode 15, and acceleration anode 9 serve to project a circularly symmetric electron beam through the interiors of helices 23 and 24 into electron beam collector cavity 38. The focus or control electrode 15 is additionally used as a control over the amplitude of the total beam current according to the invention. The primary battery or other voltage source 80 is coupled between ground and pin connector 8 to cathode structure 6, the conventional cathode heater supply not being shown. An adjustable bias voltage battery or other supply 81 is coupled from battery or source 80 to pin connector 17 of focus electrode 15; with use of adjustable source 81, the operator may set the bias voltage level at that point which corresponds to the desired beam current for a given set of conditions. Battery or source 50, also coupled to source 80, is used to supply a conventional potential level through terminal 42 to the beam collector cavity 38 in the usual manner for efficient retrieval of the spent beam energy.

As was previously observed, input transmission line 26 normally receives low level input signals which require large amplification to reach an acceptable power level at output transmission line 28. When relatively higher level signals are to be processed, they are normally applied to the high level input transmission line 27.

As is well known, the high frequency gain of a helix slow wave propagation medium interacting in the conventional manner with an electron beam is the sum of a constant term characteristic of the tube and a variable term proportional to the length of the helix and to a certain gain parameter. The latter is proportional to the one-third power of the ratio of the unmodulated electron beam current to the accelerating voltage applied between the emitter and beam acceleration anode.

Still with regard to conventional single-helix tubes, it is to be noted that, when the current from the cathode is biased to permit a change in beam current and therefore a change in high frequency input power level from a high to a low level, several significant operating parameters of the conventional tube change. First, the gain parameter is lowered in proportion to the cube root of the percentage change of the beam current. Secondly, for a given set of focussing characteristics for the tube, the electron beam diameter decreases, the beam then being over-focussed, for example, in the instance of a fixed focussing arrangement such as a periodic permanent magnet focussing configuration. The diminished beam diameter lowers the interaction coupling between the electron beam and the helix. The decreased coupling occurs especially in the upper frequency part of the pass band of the tube. Finally, since the total beam current is reduced, the space charge density of he beam is also made smaller, which has the effect of causing the frequency for maximum gain to be lowered. The net effect of these changes is that the power gain for low level input signals is lower than for higher level input signals; furthermore, the gain for the low input level pass band is at a lower frequency than for the high level input pass band.

Figure 3:
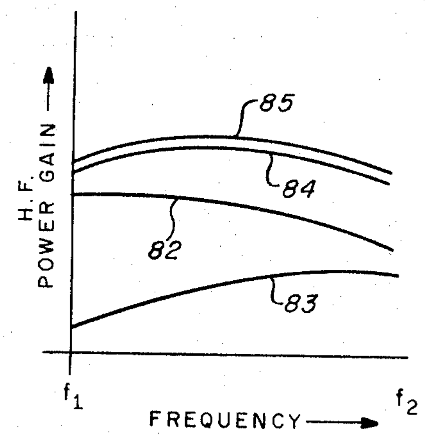

FIG. 3 graphically illustrates how this prior art defect is remedied according to the present invention and is a plot of carrier frequency versus high frequency power gain. In FIG. 3, curve 85 is a plot of a part of the high freqency gain profile of a conventional single-helix tube operating at the high input level. When the same tube is adjusted for operation upon a low input level signal the gain profile is shown by curve 82. It is seen that curve 82 falls well below curve 85, especially at higher carrier frequencies.

For the novel dual-helix, dual-input traveling wave tube of FIGS. 1A and 1B, the curve 85 again represents the gain profile of the tube for relatively high level input signals coupled only to input transmission line 27. Curve 82 also represents the gain profile of helix 24 alone for low level input signals at transmission line input 27.

However, relatively low level input signals are normally coupled to the first input transmission line 26 feeding the auxiliary helix 23. Curve 83 represents the gain profile of the auxiliary helix 23 alone; when curve 83 is combined with the gain profile curve 82 of helix 24, a total gain profile substantially like curve 84 results, curves 84 and 85 being substantially equivalent over a wide band of frequencies.

In operation, the auxiliary helix 23 has only relatively low level signals applied to it and makes a gain contribution only when such low level signals are coupled to low level input transmission line 26. The principal helix 24 does not have such high frequency low level signals coupled to it by its input transmission line 27. Helix 24 does make a significant gain contribution in this mode by virtue of the velocity modulation impressed on the electron beam by auxiliary helix 23 and the consequent gain producing interaction between the velocity modulated beam and helix 24. The voltage supplied by battery 81 is appropriately set for this first mode of operation of the tube.

When relatively high level signals are to be processed by the novel tube, these signals are applied only to the input transmission line 27 feeding helix 24 and the voltage supplied to bias or control electrode 15 is adjusted by re-setting supply 81. Switching of the high frequency signal between input ports 26 and 27 may readily be done by the operator in synchronism with the switching of power source 81 between suitable levels or may be done by synchronous or ganged switching means as will be apparent to those skilled in the art.

Helices 23 and 24 have substantially constant pitches. For example, the primary helix 24 may have a substantially constant pitch from its input port 27 to its output port 28. On the other hand, the last several turns of helix 24 adjacent output port or transmission line 28 may have a tapered pitch as shown in FIG. 1B at inner conductor 26*b* or may be arranged so that successive turns of the helix 24 are increasingly closer together approaching inner conductor 26*b*. Such arrangements allow the helix phase velocity to be matched correctly to the electron stream velocity as the electron beam gradually loses kinetic energy while increasingly transferring energy to the high frequency wave propagating on helix 24. The major constant pitch region of helix 24 is adjusted to produce optimum gain over, for example, an octave band of frequencies at the beam current used for high level input signals. The constant pitch of the auxiliary helix 23 is selected by well known methods to have a phase velocity which compensates at least in large part for the behavior of the principal helix 24 for low level signal excitation, as seen in FIG. 3.

It will be appreciated by those skilled in the art that the dimensions and proportions illustrated in the figures have been chosen in the interest of making the drawings clear, and that they do not necessarily represent values that would be selected for use in actual practice. It will further be appreciated that other known types of input and output transmission lines may be adapted for use in the invention, as well as other known types of electron beam emitters and collectors. It will be further understood that known means for severing helices 23 and 24 may be employed other than the particular attenuator arrangements described.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. A multiple-function gain compensated traveling wave amplifier comprising:

electron beam generating means having electron emitter means and anode means, beam current control grid electrode means interposed between said electron emitter means and said anode means, first and second spaced broad band slow wave propagation circuit means in energy exchanging coupled relation with said electron beam, electron beam collector means for collecting said electron beam after passage through said first and second broad band slow wave propagation circuit means, vacuum envelope means interiorly supporting in cooperative relation said electron beam generating means, said beam current control grid electrode means, said first and second broad band slow wave propagation circuit means, and said electron beam collector means, low level signal input means conductively coupled to said first broad band slow wave propagation circuit means adjacent said anode means, high level signal input means conductively coupled to said second broad band slow wave propagation circuit means, and signal output means conductively coupled to said second broad band slow wave propagation circuit means opposite said high level signal input means adjacent said electron beam collector means, said second slow wave broad band propagation circuit means being adapted to provide a characteristic high level power gain over a band of frequencies with said beam current control grid electrode means operated at a first potential for high level signals applied to said high level input means only, said first and second broad band slow wave propagation circuit means being adapted cooperatively to provide substantially said characteristic high level power gain over said band of frequencies with said beam current control grid electrode means operated at a second potential for low level signals applied to said low level signal input means only.

2. Apparatus as described in claim 1 wherein said first broad band slow wave propagation circuit means is provided adjacent its end opposite said low level signal input means with signal absorbing means for absorbing all high frequency energy remaining on said first broad band slow wave propagation means at said end.

3. Apparatus as described in claim 2 wherein:

said signal absorbing means comprises high frequency absorber material coated on first dielectric rod means supporting said first broad band slow wave propagation circuit means within said vacuum envelope means, said signal absorbing means having an absorbing effect increasing smoothly from zero adjacent said low level signal input means to a maximum effect at said end.

4. Apparatus as described in claim 2 wherein said second broad band slow wave propagation circuit means is provided adjacent its mid-portion with signal absorbing means for absorbing high frequency energy.

5. Apparatus as described in claim 4 wherein:

said second broad band slow wave propagation circuit means signal absorbing means for high frequency energy comprises high frequency absorber material coated on second dielectric rod means supporting said second broad band slow wave propagation circuit means within said vacuum envelope means, said signal absorbing means having a substantially symmetric absorbing effect substantially within said mid-portion with substantially no effect on said second broad band slow wave propagation circuit means at either side of said mid-portion.

6. Apparatus as described in claim 5 wherein said first broad band slow wave propagation circuit means comprises a helix transmission line having a substantially constant pitch.

7. Apparatus as described in claim 6 wherein said second broad band slow wave propagation circuit means comprises a helix transmission line having a substantially constant pitch.

8. Apparatus as described in claim 6 wherein said second broad band slow wave propagation circuit means comprises a helix transmission line having a major portion with a substantially constant pitch with a minor portion of increasing pitch adjacent said electron beam collector means.

* * * * *